Feb. 5, 1952     A. R. BLACKBURN ET AL     2,584,110
MOLD FOR POTTERY WARE
Filed March 27, 1947     3 Sheets-Sheet 1

INVENTOR.
RICHARD E. STEELE
ANDREW R. BLACKBURN
By Semmes, Keegin, Robinson & Semmes
Attorneys Feb. 5, 1952 A. R. BLACKBURN ET AL 2,584,110
MOLD FOR POTTERY WARE
Filed March 27, 1947 3 Sheets-Sheet 2
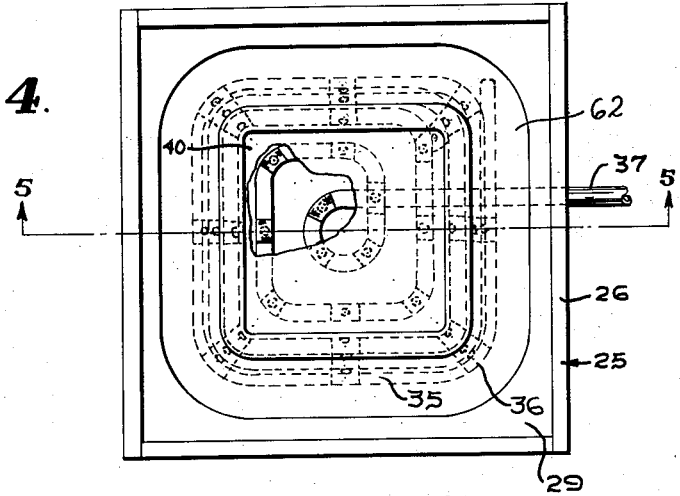
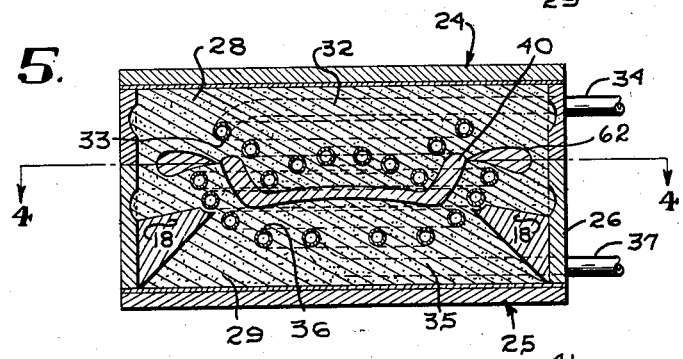
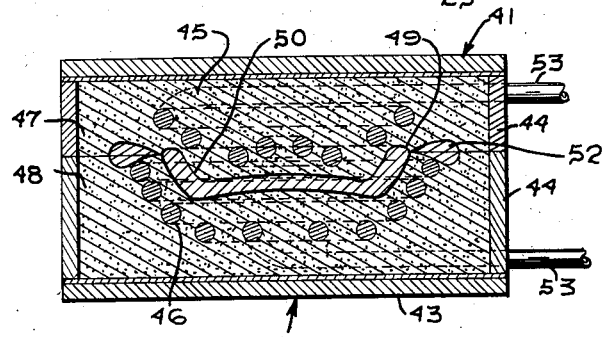
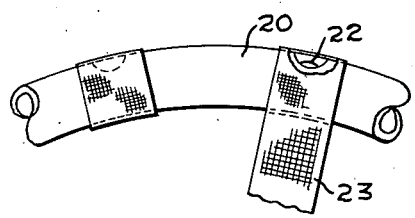
INVENTOR.
RICHARD E. STEELE
ANDREW R. BLACKBURN
By
Semmes, Keegin, Robinson + Semmes
Attorneys Feb. 5, 1952 A. R. BLACKBURN ET AL 2,584,110
MOLD FOR POTTERY WARE
Filed March 27, 1947 3 Sheets-Sheet 3

Inventor
RICHARD E. STEELE
ANDREW R. BLACKBURN
By
Semmes, Keegin, Robinson & Semmes
Attorneys Patented Feb. 5, 1952

2,584,110

UNITED STATES PATENT OFFICE 2,584,110

MOLD FOR POTTERY WARE

Andrew R. Blackburn and Richard E. Steele, Columbus, Ohio, assignors to Ram, Inc., Detroit, Mich.

Application March 27, 1947, Serial No. 737,544

5 Claims. (Cl. 25—129)

1

The present invention relates to molds, and has particular reference to a new apparatus for forming objects from moldable materials such as clay.

In some methods of molding objects such as pottery ware, a clay mass is impressed upon the face of a mold in a forming operation. The formed clay object normally is separated from the face or faces of the mold by shrinkage inherent in the clay object as the water of plasticity is removed therefrom. The water of plasticity may be removed from the clay mass by evaporation, which may be accelerated by the application of heat, or by employing a mold having sufficient permeability and porosity to accelerate dissipation of water of plasticity by absorption. It has been suggested that water of plasticity may be forced from the clay mass by the application of suitable pressures thereto.

Speed production of pottery ware, particularly ware of varying thickness and asymmetrical shape, has been prevented by normally encountered differences in the shrinkage properties in the clay mass, due to variance in the water retentive properties of the clay. It has been necessary to provide large numbers of identical molds to attain a desired high production rate. Each mold must be left in association with the objects for a length of time sufficient to permit separation of the clay objects from the mold surfaces by normal shrinkage action. Once formed, each clay object must be treated individually to ensure uniformity in drying and eliminate premature removal of the clay objects from the molds. This is especially the case in the manufacture of clay objects in irregular shapes and thicknesses, where the overall shrinkage rate is impossible to anticipate. Irregularities in shrinkage and premature handling of the clay objects prior to completion of shrinkage results in a high percentage of breakage, particularly during the finishing operations, due to stresses developed in the ware structure.

It has been suggested heretofore that clay objects may be removed from molds independently of shrinkage, by the direct application of fluid pressures against a portion of the surface of the object. This expedient has not been adapted to the manufacture of pottery ware, for the concentration of fluid pressures against a specific portion or portions of the relatively fragile, partially formed object results in a prohibitively high percentage of breakage and malformed pieces or seconds. Accordingly, this method as presently understood and practiced, has not been employed in the manufacture of the more delicate pottery

2 ware, particularly asymmetrically shaped ware of varying thicknesses.

The present invention has for an object the provision of a novel means for forming pottery ware, wherein the aforementioned difficulties are obviated.

A further object is to provide a novel mold for use in high speed production of ceramic ware which is inexpensively and easily formed.

A further object is to provide a novel mold for use in the manufacture of ceramic ware which is available for reuse immediately subsequent to forming of the clay object, markedly increasing the ware production rate with accompanying reduction of the number of molds necessary to operate a ceramic ware production line.

A further object is to provide a novel mold advantageously employed in the formation of asymmetrically shaped ceramics such as pottery ware of varying thicknesses on a speed production basis, the pottery ware being separated from the mold independently of the normal shrinkage of the ware upon loss of water of plasticity.

Still a further object is to provide a novel ceramic mold.

Other objects and advantages of the invention will be apparent from the following detailed description thereof and the drawings, wherein:

Figure 4 is a diagrammatic view, partially in plan, of a further embodiment of the invention taken along the line 4—4 of Figure 5;

Figure 5 is a vertical section of a further embodiment of the invention taken along the line 5—5 in Figure 4;

Figure 6 is a vertical section of the embodiment of the invention shown in Figure 4;

Figure 7 is a perspective view of a portion of a fluid pressure conduit which may be employed in carrying out the invention.

In a copending application Serial Number 734,174, filed March 12, 1947, there is disclosed and claimed a method and apparatus for forming ceramic objects employing molds constructed in accordance with the present invention.

In its broadest application, the present invention includes the preparation of a mass of a material capable of hardening to form a porous and permeable solid member, for use as a mold body. A surface of the mass is deformed with an impression of the object to be molded, forming a mold face having a characteristic molding contour. When two mold sections are employed cooperatively as in a pottery pressing operation, a male and female impression is made on opposing mold surfaces. The body of the mass is treated to form fluid pressure means comprising an elongated pressure chamber or conduit spaced apart from and formed generally parallel to the plane of the impression contour on the molding face. One end of the chamber opens at the surface of the mass for connection with a source of fluid pressure providing a positive pressure or a vacuum pressure therein, as desired. The opposite end of the chamber dead ends in the body of the mass. Thus treated, the mass is then hardened to form the completed mold.

The pressure chamber in the body of the mold is formed in such relation to the mold face or faces as to provide a predetermined fluid pressure emanating from the entire face of the mold adjacent the clay object, upon the application of fluid pressure to the chamber. By varying the distance between a selected part of the pressure chamber and the adjacent portion of the mold face, the fluid pressure provided at a specific point on the mold face and correlatively on the face of the adjacent clay object, may be increased or decreased as desired, in accordance with, for example, the structural strength of the clay object. Thus, there is provided means for effecting controlled separation of the clay object from the mold face.

Figure 1:
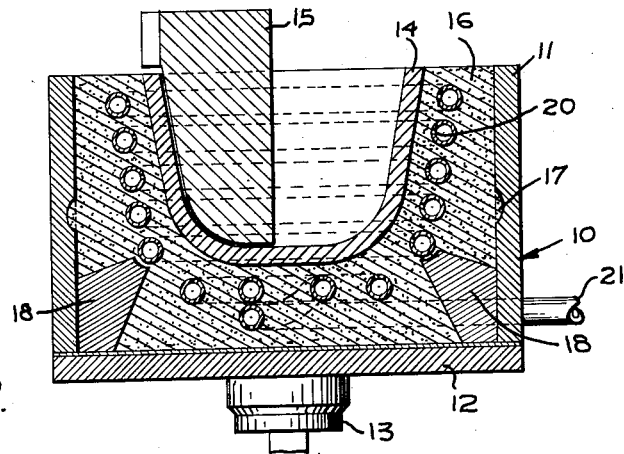
Figure 1 is a vertical section of a jiggering mold embodying the principles of the invention.
Figure 2:
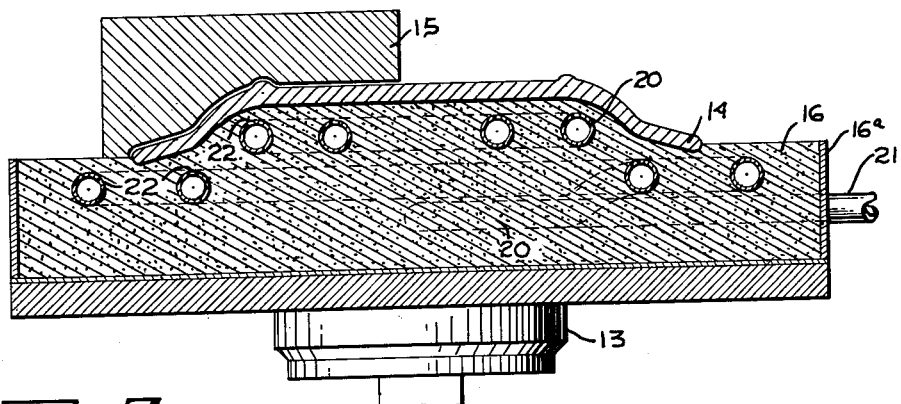
Figure 2 is a vertical section of a further embodiment of the invention.

Figures 1 and 2 of the drawings disclose the invention as applied to molds for use in jiggering operations for the forming of dinner ware. In these figures, the numeral 10 refers to a mold casing which may be constructed of corrosion resistant non-porous material, such as a metal or metal alloy, having sides 11 and a base 12. The casing 10 is carried by the usual turntable or chuck 13 for rotation to subject a clay mass 14 to the action of a forming template 15.

The casing 10 receives a mold body 16 formed of a material capable of hardening upon standing to form a solid porous element characterized by an ability to absorb moisture. A high grade gypsum plaster may be employed advantageously. It is preferred to employ a plaster characterized by extreme hardness in order to effect prolongation of the life of the mold and reduce malformation of the clay objects as a result of chipping of the mold. Air bubbles tending to form in the plaster during mixing should be removed by subjecting the wet plaster to a suitable drawing step at reduced air pressure. This prevents the formation of irregularities in the mold structure which later appear as surface deformations as the face of the mold wears away under continued use. The mold body 16 preferably is suitably anchored to the casing 10, to prevent displacement of the mold body within the casing upon the application of fluid pressure. This may be accomplished by indenting the sides 11 of the casing as at 17, forming a positive positioning lock therebetween, or by provision of suitable locking and supporting brackets 18, as shown.

In ware making operations where the clay object is shaped without undue mechanical abuse, the casing 10 need not be employed. In this instance, as shown in Figure 2, it is desirable to coat the outer surface of, or impregnate, the plaster body at 16a, with a suitable material capable of sealing off the pores of the plaster mass internally or on the surface thereof as desired, such as a plastic, shellac or a varnish, in order to prolong the life of the mold and prevent dissipation of fluid pressure other than through the molding face of the mold.

In accordance with the present invention, the fluid pressure means may comprise a conduit 20 having an extended portion 21 protruding through the casing side 11 or extending beyond the surface of the mold body 16, as in Figure 2, to attach with a source of fluid pressure, not shown. The conduit 20 may be formed of a tubular member or pipe consisting of an easily workable material which is corrosion resistant such as a malleable metal or metal alloy. A copper tube is suitable. The conduit 20 is formed with a series of perforations or apertures 22 therein opening into the plaster body 16. The perforations 22 are formed in such relation as to provide a plurality of streams of fluid pressure emanating from the body of the permeable mold in a direction generally perpendicular to the contour of the clay object 14. These pressure streams merge in the pores of the permeable plaster body to provide a controlled, evenly dispersed blanket of fluid pressure which emerges on the entire face of the mold against the adjacent clay object 14. The controlled fluid pressure blanket is accomplished by positioning the conduit 20 internally of the mold body displaced inwardly from the face of the mold in portions arranged substantially parallel to the plane of the contour of the clay object 14. It is preferred to form the pressure conduit as an expanding coil, with individual sections of the coil evenly spaced on the horizontal plane, but displaced vertically from the horizontal plane to conform the coil sections to the contour of the object 14, as shown.

The spacing and size of the perforations 22, the distance between a section of the conduit 20 and the mold face or the adjacent clay object 14, the permeability of the mold, and the lateral spacing of individual sections of the conduit, determine the amount of fluid pressure which will be exerted against a selected portion of the clay object 14. By adjusting these variables, a controlled adherence of the clay object to the mold surfaces is accomplished. For example, when the ware is formed with a relatively thin base section, the fluid pressure exerted thereagainst may be reduced by decreasing the diameter of the perforations 22 opposite the ware base, or by moving the adjacent conduit section 20 deeper into the mold body 16. Thus, regardless of the relative or differential thicknesses of the several parts of the ware, as for example the plate shown in Figure 5, a fully controlled quick release of the clay object 14 from the molds may be accomplished prior to shrinkage without damage to the ware from the ever present tendency to crack at the thin points upon the application of pressure thereto. In cases where it is desired to eliminate fluid pressure completely from a portion of the clay object surface, this may be accomplished by the application of a suitable varnish, shellac or plastic material to the complementary section of the mold body or face.

Where the fluid pressure chamber in the mold body is formed of the conduit 20, it is preferred to enclose the conduit adjacent the perforations 22 with a permeable material, preferably a fabric such as a gauze 23, as shown in Figure 7. The gauze serves the double purpose of maintaining the perforations free from obstruction through the accumulation of particles of plaster, and forms a pressure chamber between the conduit 20 and the surrounding mold body 16, adjacent the perforations 22. This arrangement expedites the speed and evenness of formation of a fluid pressure head in the mold body in the direction of the mold face, accelerating the rate of object removal from the mold.

Figure 3:
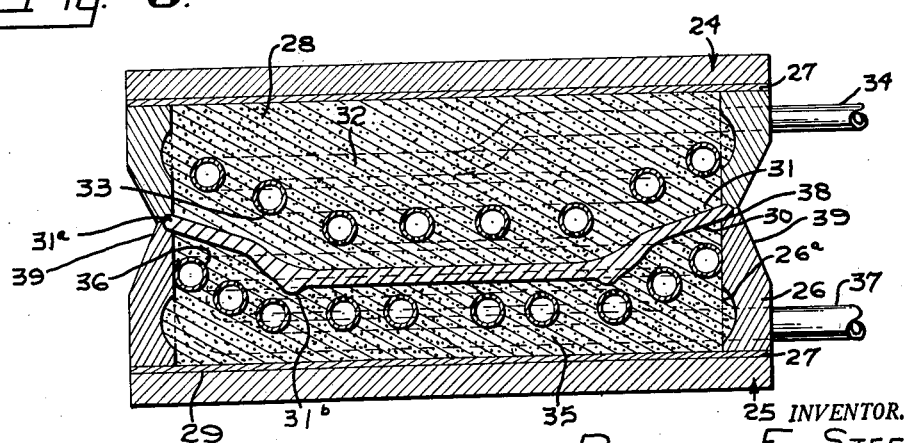
Figure 3 is a vertical section of a pottery pressing apparatus having male and female mold sections embodying the invention.

The invention as applied to the manufacture of ware in a pressure forming operation is disclosed in Figure 3. The mold assembly includes two cooperating mold sections 24 and 25 having casing walls 26 secured thereto and sealed thereon with gaskets 27 in pressure tight relation. The gaskets 27 prevent dissipation of fluid pressure by uncontrolled leakage from the molds. Casing indentations 26a serve to secure plaster mold bodies 28 and 29 within the mold sections 24 and 25. The mold bodies are provided with mold faces 30 and 31, respectively, each contoured to the shape of the ware, shown as a dinner plate 31a. The mold section 24 is provided with a fluid pressure conduit 32 having spaced perforations 33 in the conduit wall. Pressure is applied to the conduit 32 through an extension 34 leading to a source of fluid pressure not shown. The mold section 25 similarly is provided with a fluid pressure conduit 35 having spaced perforations 36 and an extension 37 attaching to a source of fluid pressure.

The mold sections 24 and 25 are adapted to be carried by a pressure applying jig, no shown, for operating the mold sections cooperatively to apply forming pressures upon lumps of plastic clay. The casing walls 26 are indented as at 38 to receive the peripheral extremity or lip of the formed ware. The outer surface of the casing 26 is chamfered inwardly as at 39, forming a cutting edge at the point of jointure of the mold sections for the purpose of removing excess clay or lip extruded from the mold faces upon the application of pressure to the plastic clay. This preferred embodiment of mold provides a cleanly formed edge on the clay object and eliminates the necessity for cleansing the mold of excess clay after each pressing operation, expediting the speed of the process.

In operation, a mass of clay is impressed upon the mold faces in the usual forming operation. Excess water of plasticity is absorbed by the porous mold bodies. Subsequent to forming of the ware and immediately prior to separation of the mold sections 24 and 25, pressure is applied to the conduit 35, effecting immediate release of the ware 31a from the female mold face 30 when the mold sections are separated. The ware 31a may then be carried on the male mold face 31 to a desired disposition point and final separation of the ware effected through application of fluid pressure to the conduit 32 in the male mold. If desired, the formed ware 31a may be separated completely from both of the mold faces by simultaneous application of pressures to the conduits 32 and 35, as the mold sections are separated, and a sweeping means provided, not shown, to secure and remove the ware.

A marked advantage of molds constructed in accordance with the present invention resides in the strength and wear qualities of the mold. By embedding the fluid pressure means in the mold body, the structural strength of the mold is retained. A particularly strong mold is obtained when a perforated conduit is employed to form the fluid pressure chamber, the conduit serving to bind and support the body of the mold against the effects of structural strain under pressure. Molds pierced by vents extending into the body thereof from the rear face frequently crack or split during use unless special supporting means are provided.

As shown in Figure 3, the pressure conduit 35 is formed in the plaster body 29 so as to provide a relatively strong blanket of pressure emanating from the mold against the face of the ware 31a adjacent the mold face 30. The coils or sections of the conduit 35 are positioned in relatively close proximity to each other and to the mold face 30, in such relation that the greatest fluid pressure is applied at the thickest points 31b of the ware 31a. The conduit perforations 36 provide fluid pressure directed generally perpendicular to and dispersed across the entire face of the ware. The outer sections of the coil are displaced vertically upwardly to follow and roughly parallel the ware contour.

The pressure conduit 32 in the mold section 24 may be formed with coil sections more widely spaced and more remotely positioned from the mold face 31, as shown. With fluid pressure of the same degree impressed on both of the conduit inlets 34 and 37, the pressure formed in the male mold section 24 will be weaker than the pressure formed in the female mold section 25. This establishes the order of separation of the ware from the opposed mold faces when the mold sections 24 and 25 are separated. It is obvious that the pressure system arrangement shown may be modified by the operator to meet the requirements of a particular molding operation by simple adjustment of the variable factors of conduit perforation size, and the distance laterally between sections of the conduits 32 and 35 and vertically between the associated mold faces. Thus, the adherence of the clay object to the mold faces may be controlled by the operator by forming the mold sections in accordance with manufacturing requirements of operation speed and known difficulties in handling the ware due to differential thicknesses. The available fine control of the ware releasing pressures, provides a method and means for accomplishing a quick release of ware from the mold regardless of the effects of differential shrinkage, without danger of injury to the ware from the application of fluid pressures thereto.

Figures 4 and 5 of the drawings disclose the invention as applied to formation of a relatively square piece of ware 40 having marked differences in thickness. The numeral designations of mold parts are the same as employed with identical parts described in connection with Figure 3 of the drawings. A clay extrusion cavity 62 is provided in the mold section bodies 28 and 29 adjacent the extremity or edge of the ware 40, to receive excess clay obtained when the cooperating mold sections are joined in the application of pressure on the object 40. A preferred arrangement of fluid pressure conduits 32 and 35 formed in accordance with special considerations of variations in ware shape and thickness and the correlated application of ware releasing pressures, is described. The principle of spacing the several coil sections of the pressure conduits 32 and 35 in accordance with the thickness of the ware and generally parallel to the contour of the ware to provide a controlled release thereof from the opposed mold faces, is clearly illustrated.

A preferred embodiment of the invention is disclosed in Figure 6 of the drawings, wherein the pressure conduit of the invention is in the form of an elongated chamber or bore formed in the body of the plaster mold. The numerals 41 and 42 refer to male and female mold sections having bottoms 43 and sidewalls 44 joined in pressure tight relationship. Pressure chambers 45 and 46 are formed in mold bodies 47 and 48, in the form of a coil with sections positioned so as to follow the contour of a clay object 49. Male and female mold faces 50 and 51 cooperate to shape the clay object 49, excess clay being extruded into a peripheral collecting cavity 52.

To form the pressure chambers 45 and 46, a casting of a malleable material having a low melting point is shaped to the desired chamber design following the contour of the object to be formed. The casting is inserted in the mold casing, secured, and liquid plaster poured around the casting. The mold faces 50 and 51 then are formed in proper relation to the casting design with suitable forming means such as a master mold, and the plaster hardened. The casting is then removed by subjecting the mold section to elevated temperatures, causing the casting material to melt. The melted material is exacuated from the chamber through extensions 53, which also serve to connect the chamber to a source of pressure, not shown. Evacuation may be accelerated by the application of sub-atmospheric pressures to the chamber. The pressure chamber then may be cleansed by suitable mechanical means or solvents, to free the inner surfaces of the chambers of residual casting materials.

A low melting point wax may be employed advantageously as a casting material. A low melting point metal alloy such as a bismuth alloy, also is satisfactory for this purpose. The melting point of the casting materials employed should be below the boiling point of water in order to avoid damaging the mold body during the heat treatment. If the plaster is dry, temperatures above 150° F. should be avoided.

Operation of this embodiment of the invention is as previously described in connection with use of perforated conduits as fluid pressure means in the mold bodies.

Figure 8:
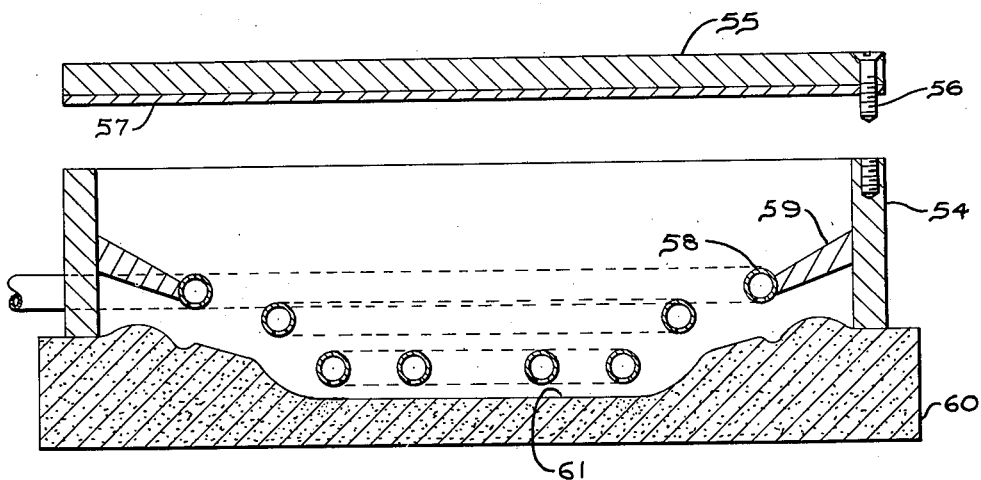
Figure 8 is a vertical section of a mold forming means.

The preferred method of forming a mold in accordance with the invention, will be described with reference to Figure 8 of the drawings, wherein the numeral 54 refers to a mold casing of metal or other suitable material, having a bottom 55 normally secured thereto by screws 56 in air-tight relation therewith on a sealing gasket 57. The numeral 58 indicates a perforated fluid pressure conduit or a chamber casting, as desired, positioned by supporting brackets 59. The numeral 60 refers to a master mold block formed of suitable material having a molding face 61 formed as a female mold to be employed in shaping male mold surfaces.

The mold casing 58 is thoroughly cleansed, inverted and positioned in proper registration over the face of the master block 60. The bottom 55 of the mold is removed and the conduit 58, preformed in accordance with the desired mold face contour, positioned and secured within the casing 54 by brackets 59. A fluid mixture of gypsum plaster and water is prepared and agitated preferably under reduced pressure to remove entrapped air bubbles. As the mix starts to thicken, approaching the plastic state, it is poured into the mold casing 54 over the conduit 58 forming a cooperating male mold face against the adjacent face 61 of the master block 60. The mold casing is filled, the bottom 55 secured to the casing 54, and the mold allowed to set until the plaster hardens. The mold may be separated cleanly from the master block 60 by the application of super-atmospheric pressure to the conduit 58.

Molds manufactured in accordance with the present invention may be employed in the manufacture of ware from any type clay or other molding material. As separation of the clay object from the mold face is accomplished prior to object shrinkage, unpredictable production factors associated with differing contraction properties of different types of clays, are eliminated. The molds may be employed advantageously to convert present plastic pressing or casting methods of ware manufacture to high speed production.

The principle of employing controlled air release of ware in combination with a permeable mold surface may be employed in combination with conventional metal mold surfaces, where it is desired to simplify release of the clay object at certain points on the surface of the metal mold face. Combination metal and permeable mold surfaces embodying the controlled air release principle as disclosed herein are particularly adaptable for mass or speed production purposes.

Removal of excess moisture from the molds may be accomplished by blowing moisture therefrom, by heating, or by the application of sub-atmospheric pressures to the pressure conduits or chambers subsequent to completion of an object forming operation. This auxiliary use of the pressure conduits as a means of controlling the moisture content of the porous mold may be accomplished without interference with the primary function of the pressure conduit in providing controlled fluid pressure release of ware from the mold surfaces. The application of vacuum to the porous mold preferably is accomplished in timed relation to the separation of the cooperating mold sections and freeing of the clay object by the application of a positive pressure to one or both of the mold faces, in pressure forming operations.

The fluid pressures employed in carrying out the invention may vary in accordance with the conformation and delicacy of the ware being treated. Simple experiment will reveal the maximum pressure which may be employed in a particular instance to attain maximum production rate with minimum wastage. In the manufacture of more or less symmetrical ware, fluid pressures ranging between 50–80 pounds per square inch are satisfactory.

Molds constructed in accordance with the invention may be employed continuously in clay object forming operations, eliminating the current practice of providing large numbers of molds which must remain in use in one object forming operation, until the clay object separates therefrom by normal shrinkage.

Molds manufactured in accordance with the present invention may be employed advantageously in the manufacture of pottery ware, decorative tile, terra cotta, refractories, and electrical porcelains. The principles of the invention may be employed to advantage in forming molds for use in any clay object forming processes being particularly advantageous for use in the speed manufacture of asymmetrically shaped objects characterized by varying thicknesses.

Obvious adaptations of the invention will occur to one familiar with the art. The invention

We claim:

1. A mold comprising a porous mold body having a molding face and fluid pressure supply means embedded within the permeable body and extending therethrough to provide a source of fluid pressure extending opposite all portions of the mold face, selected portions of the fluid supply means being more deeply embedded in the porous mold body than other portions to modify the fluid pressure emanating from the mold face opposite the said selected portions, thereby providing a controlled fluid pressure flow characterized by selected areas of relatively high and low fluid pressure emanating from the molding face.

2. A mold for forming ware having portions of different thickness comprising a permeable mold body having a molding face for shaping a moldable material, and a fluid pressure supply member embedded in the permeable body and arranged in such relation to the molding face as to selectively apply fluid pressure through desired portions of the molding face simultaneously selectively proportional to the thickness of the moldable material on said desired portions of the molding face for releasing the ware from the molding face.

3. A mold for forming ware having portions of different thickness comprising a permeable mold body having a forming face for shaping ware, a perforated conduit embedded in the permeable body spaced from the forming face, and means for applying fluid pressure thereto to provide a blanket of fluid pressure at the said face, said conduit being so formed and positioned in the mold body so as to provide the highest fluid pressure at points adjacent the thickest portions of the ware, and the lowest fluid pressure at points adjacent relatively thinner portions of the ware.

4. A mold comprising a permeable base having a forming face, fluid pressure means for applying pressure through the forming face, and means including a wrapping associated with the fluid pressure means to form a pressure chamber around the fluid pressure means in the permeable base, for building up a pressure head in selected portions of the permeable base, said fluid pressure means and wrapping means being adapted to cooperatively effect even removal of wares from the molding face.

5. A mold comprising a permeable base having an object forming face, a perforated conduit embedded in the permeable base for applying fluid pressure through the forming face, and fabric means between the permeable mold surface and the conduit covering the perforations in the pressure conduit and forming a pressure chamber around the conduit, said perforated conduit and fabric means being adapted to cooperatively effect even removal of wares from the object forming face.

ANDREW R. BLACKBURN.
RICHARD E. STEELE.

REFERENCES CITED

The following references are of record in the file of this patent:

UNITED STATES PATENTS

| Number | Name | Date |
|---|---|---|
| 961,214 | Crane | June 14, 1910 |
| 1,188,051 | Edstrom et al. | June 20, 1916 |
| 1,344,885 | Hall | June 29, 1920 |
| 1,717,996 | Moore, Jr. | June 18, 1929 |
| 1,747,249 | Korompay | Feb. 18, 1930 |
| 1,811,950 | Meacham | June 30, 1931 |
| 2,137,359 | Shultz | Nov. 22, 1938 |
| 2,315,394 | Brosius | Mar. 30, 1943 |
| 2,331,000 | Shaefer | Oct. 5, 1943 |
| 2,366,435 | Brown | Jan. 2, 1945 |